3,346,387
WHIPPING ASSISTANT AND COMESTIBLES
UTILIZING SAME
James Moncrieff, Mundelein, Walter M. Cochran, Highland Park, Rudy Ellinger, Prospect, and Donald E. Miller, Oak Park, Ill., assignors to The Glidden Company, Cleveland, Ohio, a corporation of Ohio
No Drawing. Filed Mar. 2, 1964, Ser. No. 348,857
6 Claims. (Cl. 99—1)

ABSTRACT OF THE DISCLOSURE

A whipping assistant particularly adapted for foaming an aqueous, normally fluent foodstuff comprising a blend of about 40 percent to about 80 percent by weight of stearyl and palmityl (mono) lactylic acids and about 20 percent to about 60 percent by weight of free stearic and palmitic acids, the blend being promoted with fatty acid mixed mono- and diglycerides having an iodine value not substantially above about 20 percent. Preferably, about 0.1 to 7 parts of the blend is present per part of the mixed mono- and diglycerides, and the ratio of monoglycerides to diglycerides is between about 0.2:1 and 9:1.

---

Most people are familiar with gasified products which are whipped readily such as whipped cream, whipped toppings, egg white and the like. Many other food products have been whipped for one reason or another, e.g., to extend their surface area and prepare them for dehydration or to enhance their appearance or novelty, e.g., fruit sauces, tomato paste, milk, fruit juices, candy centers, etc. Many such foods yield poor or unsatisfactory foams, and require added whipping assistants to entrap air or gas in sufficient proportion and with adequate distribution of bubbles. In many such instances no assistant is available, or if it is, it is insufficiently active to yield a desirably uniform or stable foam, or it imparts undesirable flavor or aroma.

We have now found a whipping assistant which is excellent for aerating or otherwise gasifying an extremely wide variety of aqueous materials such as foodstuffs to give a high "overrun" and a desirably stable foam that foodstuffs at low concentration of assistant. Our whipping assistant consists essentially of a blend of about 40–80% stetaryl and palmityl (mono) lactylic acids and about 60–20% free stearic and plamitic acids promoted with fatty acid mixed mono- and diglycerides having iodine value not substantially above about 20.

In our process for foaming a normally fluent (under shear stress) foodstuffs such as a fruit or vegetable juice, puree, nectar, milk, mashed potatoes, gelatin, syrup, pudding or mousse, soup, starch material, condiments, or sweet goods, we intimately disperse about 0.1–2%, basis the weight of mixture to be whipped, of our whipping assistant in the goods, and gasify the resulting mass by mechanical whipping with conventional beater or with an inocuous propellant gas such as nitrous oxide, nitrogen, $CO_2$, or octafluorocyclobutane. In this state the foam can be eaten or dried because of its extended surface. If dried to a paste or preferably to a powder of discrete, ostensibly dry particles, it can be reconstituted by addition of sufficient water, milk, wine, juice, or other edible liquid, or a mixture of same, rewhipped or similarly regasified. Small, discrete, ostensibly dry particles are especially desirable for handling and packaging as they have no supporting liquid phase or apparent bodies of free liquid and are free-flowing. Ordinarily, they have less than about 10% water content and in most instances less than 2%.

Recently acyl lactylic acids having acyl radicals of saturated and unsaturated fatty acids containing from 14–22 carbon atoms and 1 to 6 or more lactylic groups in the molecule have been available. Their preparation is shown, for example, in U.S. Patents 2,789,922; 2,733,252; and 2,744,825.

The acyl lactyltic acid-providing substance for our whipping assistant is a blend of fatty acyl lactylic acids and free fatty acids, the acyl lactylic acids themselves being a complex mixture of fatty acid esters of (mono) lactylic acid, lactyllactic acid, and polylactyllactic acids, the proportion of acyl (mono) lactylic acid plus acyl lactyllactic acid advantageously amounting to at least about 85% of the total acyl lactylic acids present. The presence of at least about 20% of free fatty acid (basis weight of blend) in the acyl lactylic acid blend and advantageously up to as much as about 35–60% in some cases, is important for our whipping purposes and needs to be present. The most preferred acyl lactylic acids for best whipping effects at low concentration preponderate in acyl (mono) lactylic acids over acyl (poly) lactylic acids, that is, the acyl lactyllactic, acyl dilactyllactic acids, etc.; the most highly preferred are those in which, of the total acyl lactylic acids present, at least about 90% are acyl (mono) lactylic acids and the acyl (poly) lactylic acids are at a minimum.

The fatty acyl radicals in the useful lactylic acids and free fatty acids, considered for convenience as one component of this whipping assistant, are completely saturated or almost completely saturated (I.V. not greater than about 6). Because the acyl lactylic acids and fatty acids of our selection are derived from natural products, small proportions of $C_{14-22}$ fatty acid acyl radicals other than stearyl and palmityl (i.e., about 10% maximum of the acyl (mono) lactylic acids and 10% of the free fatty acids in the whipping assistant) can be present and tolerated without significant effect. Acyl radicals in these compounds having less than 17 carbon atoms are considered broadly herein as "palmityl" and those having 17 or more carbon atoms are considered broadly herein as "stearyl." Thus, minor percentages of, for example, myristyl, arachidonyl, behenyl, and oleyl radicals can be tolerated.

The other component in the blend is an edible substance providing fatty acid mixed mono- and diglycerides having iodine value not substantially above about 20, advantageously below 10, and preferably not above 5. The fatty acid radicals of such partial glycerides are preponderantly saturated, and generally predominate in palmitic and longer chain radicals. For efficiency and economy this substance preferably is a conventional superglycerinated hard fat which contains ordinarily about 35–45% fatty monoglyceride, the balance being preponderantly fatty diglyceride with a very small amount of fatty triglyceride. More broadly, however, the mixed mono- and diglycerides can be in a monoglyceride to diglyceride ratio between about 0.2:1 and about 9:1, beyond which range in either direction whipping effectiveness falls off markedly. The broadest proportion of blend to these mixed partial glycerides that we use is about 0.1–7 parts of the acyl lactylic acid-free fatty acid blend per part of the mixed mono- and diglycerides; beyond this range in either direction whipping effectiveness also is substantially less.

The substance providing the mixed mono- and diglycerides advantageously also can be a food emulsifier mixture containing, for example, from about 10–40% fatty acid monoglyceride in free state and sufficient fatty acid diglyceride in free state to furnish the necessary monoglyceride to diglyceride ratio e.g. a glycerol mixed ester of lactic and higher fatty acids with these mixed free partial glycerides as is made for example, by the processes defined in U.S. Patent 3,011,896 or 2,690,971.

One of the special benefits of our whipping composition is that it is particularly tolerant to fatty coproducts which are often a significant and substantial proportion of the fatty acyl lactylic acid-providing and fatty monoglyceride-providing substances, and are always present in the most economical sources of these materials.

While very high purity fatty monoglycerides alone are often useful whipping assistants in a variety of fluent foodstuffs, such monoglycerides lose effectiveness rapidly when cut back with fatty diglycerides. The superglycerinated fats usually have little or no broad effectiveness whatsoever by themselves. Similarly, we have found that when glycerol-mixed esters of lactic and fatty acids (containing from 10–40% free monoglyceride) are used alone as whipping assistants in a manner like very high purity monoglycerides, they require about six times the concentration to achieve essentially equivalent foam volume.

Surprisingly also, fatty acyl lactylic acids, having acyl (mono) lactylic acid plus acyl lactyllactic acid of desirably high concentration (85% or higher basis total acyl lactylic acids present) give negligible overrun with a wide variety of fluent foodstuff when used alone, but when blended with a fatty acid mono- and diglyceride providing material such as a superglycerinated fat or such glycerol mixed esters containing free monoglyceride and free diglyceride, they give excellent high foams with the same foodstuff; an unexpected synergism because of the presence of the fatty acid mono- and diclycerides is evident. However, the fatty acid mono- and diglycerides must have an I.V. not substantially more than 20 to exert this synergism in significant fashion, and it has been our observation that substances which provide "soft" fatty acid mixed mono- and diglycerides (that is, having an I.V. above about 20) have little promotional value for foaming; advantageously, for whipping efficiency, the fatty acid mixed mono- and diglycerides have an I.V. below 10 and preferably not above 5 to obtain the greatest overrun, fineness in bubble size, evenness of bubble distribution, and long term stability of the resulting food foam.

All percentages herein are weight percentages unless otherwise expressly indicated. In the following exemplary preparations, the compositions used were of the following analysis (the acyl lactylic acid materials were analyzed by gas chromatography):

A. 0.17% free lactic acid; 0.2% free palmitic acid; 5.8% free stearic acid; 3.9% palmityl (mono) lactylic acid; 1.8% margaryl (mono) lactylic acid; 87.0% stearyl (mono) lactylic acid; 0.2% palmityl lactyllactic acid; 1.1% stearyl lactyllactic acid.

B. 0.27% free lactic acid; 3.7% free palmitic acid; 0.1% free stearic acid; 88.8% palmityl (mono) lactylic acid; 2.6% stearyl (mono) lactylic acid; 3.8% palmityl lactylic acid; and 1% palmityl dilactyllactic acid.

C. 1% free myristic acid; 13.8% free palmitic acid; 11.4% free stearic acid; 4.2% myristyl (mono) lactylic acid; 37.6% palmityl (mono) lactylic acid; 31.1% stearyl (mono) lactylic acid; 0.8% myristyl lactyllactic acid; 0.1% palmityl lactyllactic acid; and a trace of stearyl lactyllactic acid.

D. 53.6% free fatty acids, 53% of which were stearic acid, 36.2% of which were palmitic acid, and the balance homologous fatty acids down to myristic; 1.3% myristyl (mono) lactylic acid; 18% palmityl (mono) lactylic acid; 1.8% margaryl (mono) lactylic acid; 25.1% stearyl (mono) lactylic acid; and 0.2% myristyl lactyllactic acid.

E. A superglycerinated fat made from hydrogenated tallow stearine having maximum I.V. of 5, the composition being 44% monoglycerides preponderantly of stearic and palmitic acids, 55% diglycerides prependerantly of stearic and palmitic acids, the balance being triglycerides preponderantly of stearic and palmitic acids; capillary melting point was 140° F.

F. A superglycerinated fat made from hydrogenated soybean oil having capillary melting point of 116° F. and I.V. of 75.

G. Distilled monoglyceride having I.V. below 2, monoglyceride content about 95%; free fatty acid maximum concentration of 0.6%; capillary melting point of 154–156° F.; and ratio of stearic to palmitic acid equivalents of about 66:31.

H. Distilled monoglyceride similar to composition G, except that I.V. was 40, capillary melting point 140° F., and the ratio of stearic to palmitic acid equivalents was about 1:2.

I. Distilled monoglyceride similar to composition G, except that I.V. was 98, capillary melting point 104° F., and the ratio of stearic to unsaturated acid equivalents was about 1:11.

J. A high diglyceride material made from distilled hydrogenated diglyceride having only 3.88% monoglyceride content and 95% diglyceride content, I.V. less than 2, and capillary melting point 150–160° F.

K. A mixture of stearic and palmitic acid mono- and diglycerides with glycerol esters of mixed lactic, palmitic and stearic acids, and a small amount of triglycerides, the ratio of stearyl to palmityl radicals being about 33:13, the free monoglyceride of fatty acid content being about 10%, the free diglyceride of fatty acid content being about 18%, the I.V. less than 5, and the capillary M.P. being 112° F. Composition made by reacting together superglycerinated fat with lactic acid in the equivalent mol ratio of one mol of lactic acid per one mol of fatty acid per one mol of glycerine.

L. A mixture of mono- and diglycerides prepared from hydrogenated tallow having I.V. of 2–4, capillary melting point between 142 and 146° F. and ratio of mono- to diglycerides of about 2:1 (so-called "65% monoglyceride").

M. 2.2% free palmitic acid; 30.8% free stearic acid; 3.4% palmityl (mono) lactylic acid; 38.9% stearyl (mono) lactylic acid; 1.4% palmityl lactyllactic acid; 16.1% stearyl lactyllactic acid; and 5.7% stearyl polylactyllactic acids having from 3–5 lactyl radicals.

N. A superglycerinated fat made from hydrogenated soybean oil having maximum I.V. of 0–2, composition being about 44% monoglycerides preponderantly of stearic and palmitic acids, 55% diglycerides preponderantly of stearic and palmitic acids, the balance being triglycerides of stearic and palmitic acids; capillary melting point was 145–150° F.

Unless otherwise specified in the following exemplary preparations, the whipping assistant mixture was dispersed in the aqueous foodstuff by adding it directly to the product to be whipped, then heating the foodstuff to 150° F. ±5° while stirring. The whipping was done at No. 10 speed (highest) in a household-type food mixer having two counter-rotating, enmeshing beaters (Hamilton Beach brand) for 7 minutes at 150°±5°. The percent of overrun was computed by subtracting the final specific gravity of the goods to be whipped from the initial specific gravity of the whipped goods, dividing this difference by the final specific gravity and multiplying the quotient by 100. Specific gravity was determined relative to water at 77° F. The following examples show the unforeseen effects of, and important compositional relationships in, our promoted whipping assistant for whipping various aqueous foodstuffs, but are not to be considered as limiting our invention. Except as where specially indicated the food foams were of desirably fine bubbles, stiff, and stable (exhibiting no particular collapse or shrinkage in 24 hours at room temperature).

*Example 1*

The food whipped was canned applesauce, using 1% of various blends of free fatty acids and acyl lactylic acids to evaluate the effect of concentration and type of free fatty acid.

| Whipping Assistant Compositions Mixed | Free Fatty Acid in Resulting Mixture, Percent | Specific Gravity of Whipped Mixture | Percent Overrun of Whipped Mixture |
|---|---|---|---|
| 100% A | 5.8 stearic, 0.2 palmitic | 0.813 | 29.2 |
| 97% A, 3% stearic acid | 11.8 preponderantly stearic | .817 | 28.5 |
| 87% A, 13% stearic acid | 20.9 preponderantly stearic | .613 | 71.3 |
| 82% A, 18% stearic acid | 25.4 preponderantly stearic | .604 | 73.8 |
| 80% A, 20% stearic acid | 27.3 preponderantly stearic | .577 | 82.0 |
| 77% A, 23% stearic acid | 30.0 preponderantly stearic | .543 | 93.4 |
| 72% A, 28% stearic acid | 34.5 preponderantly stearic | .743 | 41.3 |
| 60% A, 40% stearic acid | 45.4 preponderantly stearic | .850 | 23.5 |
| 77% A, 23% oleic acid | 30.0 (of which 76.7% is oleic acid, 22% is stearic, and the balance is palmitic). | (¹) | |

¹ No appreciable whip.

The foregoing shows that a substantial proportion of free stearic and palmitic fatty acids is important in obtaining some whipping, that a substantial fraction of free "soft" fatty acid substituted for free stearic and palmitic acids ruins such whipping effectiveness as is obtained.

*Example 2*

The same kind of test as in Example 1 was run to evaluate the effects of stearyl-rich against palmityl-rich acyl lactylic acids and of acyl lactylic acids rich in acyl (poly) lactylic acids against those low (less than 10) in the acyl (poly) lactylic acids.

acid content of 30%. Various proportions, as tabulated, of the acyl lactylic-fatty acid blends mixed with composition E (hard superglycerinated fat) to form the whipping assistant gave the following performance with canned applesauce at 1% whipping assistant dosage:

| Percent of Acyl Lactylic Acid-Fatty Acid Blend in Whipping Assistant | Percent of Super-Glycerinated Fat in Whipping Assistant | Specific Gravity of Whipped Product | Overrun, percent |
|---|---|---|---|
| 20 | 80 | .475 | 121 |
| 30 | 70 | .285 | 268 |
| 40 | 60 | .230 | 357 |
| 50 | 50 | .175 | 500 |
| 60 | 40 | .143 | 634 |
| 70 | 30 | .150 | 600 |
| 100 | 0 | .543 | 93.4 |

When essentially the same sort of fatty acid-acyl lactylic blend was promoted with composition F, a "soft" super- glycerinated fat (having I.V. substantially above 20), the whipping of the same kind of applesauce was as follows:

| Percent of Blend in Whipping Assistant | Percent of Super-Glycerinated Fat in Whipping Assistant | Specific Gravity of Whipped Product | Overrun, Percent |
|---|---|---|---|
| 40 | 60 | 0.680 | 50.0 |
| 60 | 40 | 0.675 | 50.7 |

| Whipping Assistant Compositions | Free Fatty Acid in Resulting Mixture, Percent | Specific Gravity of Whipped Mixture | Percent Overrun of Whipped Mixture |
|---|---|---|---|
| 100% A | 5.8% stearic, 0.2% palmitic | 0.813 | 29.2 |
| 100% B | 3.7% palmitic, 0.1% stearic | .917 | 14.5 |
| 50% A mixed with 50% of an acyl lactylic acids reaction of similar composition except that it contained 42.4% acyl (poly) lactylic acids. | Approx. 6%, preponderantly stearic | .947 | 11.0 |

The foregoing shows that unpromoted stearyl lactylic acids are more generally somewhat efficacious than unpromoted palmityl lactylic acids for whipping, and that a large proportion of acyl (poly) lactylic acids to detract markedly from such whipping effectiveness as is obtained. As is shown in Examples 4, 5, and 6, however, the strong promotional effect of "hard" mono- and diglycerides of fatty acids is so great as to permit considerable leeway in selection of palmityl versus stearyl lactylic acids and in toleration of a substantial proportion of acyl (poly) lactylic acids.

*Example 3*

The promotional effect of the mixed "hard" mono- and diglycerides on the lactylic acid-fatty acid blends is shown dramatically in the following tabulated experiments. The acyl lactylic acid-fatty acid blend used was composition A adjusted with stearic acid to give a constant free fatty

*Example 4*

When the monoglyceride/diglyceride ratio of the promotional additive was varied in tests of whipping assistant mixtures such as those tabulated in the first part of Example 3, the results showed that the monoglyceride-diglyceride ratios above about 9:1 and below about 0.2:1 detracted severely from the whipping effectiveness of the promoted blend, even when the promotional additive alone possessed fair whipping properties; additionally they pointed up the synergism of the "hard" mono- and diglyceride mixtures of fatty acids on acyl lactylic acids and the poor effect of "soft" glycerides promoters. The blend of acyl lactylic acids and free fatty acids was composition C, and the monoglyceride-providing material was selected to vary the ratio of mono- to diglycerides. The food whipped was canned applesauce.

| Percent of Composition C in Whipping Assistant | Promoting Monoglyceride Composition Used | Specific Gravity | Percent Overrun |
|---|---|---|---|
| 30 | 70% E | 0.247 | 325 |
| 30 | 70% G | 0.637 | 65 |
| 30 | 70% H | (1) | -------- |
| 30 | 70% I | (1) | -------- |
| 30 | 70% J | (1) | -------- |
| 30 | 70% L | 0.340 | 200 |
| 0 | 100% J | (1) | -------- |
| 0 | 100% G | 0.330 | 243 |
| 0 | 100% E | 0.750 | 36 |
| 0 | 100% K | 0.720 | 40 |

1 No appreciable whip.

Example 5

A number of runs were made with varying ratios of composition E and mixed with composition C on the one hand and D and C on the other to give a total whipping assistant concentration of 1% in canned applesauce. These tests showed that the promotional effect of "hard" mono- and diglycerides permitted a broad range of fatty acid concentration of the fatty acid-acyl lactylic acid blend while obtaining good whipping properties. The results are tabulated as follows:

| Blend Used | Percent Composition E Used | Specific Gravity | Percent Overrun |
|---|---|---|---|
| 10% C | 90 | .423 | 148 |
| 20% D | 80 | .370 | 184 |
| 20% C | 80 | .303 | 247 |
| 30% D | 70 | .263 | 299 |
| 30% C | 70 | .247 | 325 |
| 40% D | 60 | .250 | 320 |
| 40% C | 60 | .240 | 338 |
| 50% D | 50 | .237 | 343 |
| 50% C | 50 | .213 | 393 |

Example 6

Various blends of compositions C and K were made up and tested at 1% concentration for whipping properties on canned tomato juice.

| Percent C | Percent K | Specific Gravity | Percent Overrun |
|---|---|---|---|
| 10 | 90 | 0.207 | 383 |
| 20 | 80 | .143 | 599 |
| 30 | 70 | .143 | 599 |
| 40 | 60 | .143 | 599 |
| 50 | 50 | .120 | 733 |

In all cases the foam was firm and stable with desirably small bubbles, except in the first case where the foam was stable, but slightly "soupy."

Example 7

A whipping assistant was compounded with 30% composition C, 35% composition E, and 35% composition K. At 1% dosage of whipping assistant the following foods were whipped to give excellent, copious, stable foams: thawed and reconstituted frozen orange juice, fresh whole milk, powdered skim milk reconstituted with water, brewed coffee, beef bouillon, chicken soup, molasses, thin boiling wheat starch (10% in water), gelatin solution, and puree of carrots. Even plain water dosed at 1% with this assistant gave a foam having specific gravity of 0.070 that remained stable overnight.

A chocolate mousse mix was made by blending two cups of whipping cream, one cup of canned chocolate sirup (Hershey's brand), ½ cup of confectioners' sugar, ¼ teaspoon salt, and 1 teaspoon of gelatin, heating the mixture to 150° F., adding 1% of the same sort of whipping assistant, and beating until stiff (about 5 minutes). It formed an excellent, stable, foamed dessert. A sample was dried on bun pans, collected as a powder, then reconstituted with water. It reconstituted excellently and rewhipped to essentially the same sort of stable, foamed dessert as when originally made. A control run was made without the whipping assistant; the mixture did not whip to a foam at all.

Example 8

A mixture of 30 parts of composition C and 70 parts of composition E gave excellent, copious, stable foams as a whipping assistant when added to the following materials on a 1% basis and whipped: tomato puree, tomato paste, banana puree, thawed frozen grape juice, freshly-mashed potatoes, canned chocolate sirup, milk chocolate, thawed frozen pineapple juice, prune juice, and mustard.

Example 9

Into a tomato paste having 32% solids (cold break) there was dispersed 1% basis solids (or 0.32% basis total) of a blend of 70 parts of composition E and 30 parts of composition C, the foaming assistant mixture being melted into a small aliquot portion of the tomato paste, thoroughly mixed, and that portion of tomato paste dispersed throughout the balance of the mixture. The product was whipped for five minutes at ambient temperature to give a foam having a specific gravity of 0.5. The resulting foam showed negligible tendency to drain or collapse on standing for 10 minutes. It was spread to a substantially uniform thickness of about 1/10 inch on a perforated stainless steel plate having ⅛-inch diameter holes on 3/16-inch centers. Air was blown from the bottom to perforate the foam in the form of craters. The foam showed no tendency to flow back in the holes after perforation and did not spatter during its perforation with air. The thus-perforated foam was exposed on the plate to air at 200° F. for about 3 minutes to dry it, and the perforated foam remained stable. The dried product (less than about 2% moisture) had excellent color (dark and rich) and did not yield a comparatively paler material when reconstituted as is often typical of tomato pastes dehydrated in this manner, and had no bitter flavor as is often found as a result of such process in using a conventional foaming assistant composition such as composition G in the same proportion. Additionally, the product could be refoamed by a second whipping when reconstituted with water.

Example 10

Mellorine frozen dessert made with a fat which is rich in polyunsaturated fatty acid radicals is often difficult to whip up and freeze to obtain the desired amount of overrun in a practical freezing time. A mellorine formulation was made as follows: 10% mixed vegetable fats, 12% skim milk powder, 12% sucrose, 5% corn sirup solids, 61% water, plus a whipping agent. The mixture was warmed to 160° F. for 15 minutes to pasteurize it, then homogenized in two stages using a pressure of 2,000 p.s.i.g. in the first stage, and 500 p.s.i.g. in the second. The homogenized mix was cooled rapidly on a conventional surface cooler to below 60° F. then aged overnight in a cooling room (at 36–53° F.). The vegetable fat in the formulation was a blend of 65% of refined safflower oil and 35% hydrogenated soybean oil of 107° F. Wiley melting point. The congeal point of the blend was 28.5° C., and its Wiley melting point 98° F.

The cooled mixture was put into a conventional batch freezer and cooled to 24° F. with whipping agitation. The whipping was discontinued when there was no increase in overrun, that is, when maximum overrun had been reached. The table below summarizes the results.

| Whipping Agent | Percent Used Based on Mellorine Composition | Whipping Time, Minutes | Percent Overrun Based on Initial Volume |
|---|---|---|---|
| M-N Mixture | 0.2 0.4 | 11.00 | 96 |
| M-N Mixture | 0.4 0.4 | 9.75 | 102 |

These samples possessed characteristics required for bulk packaging, having desired overrun and producing a mellorine of very fine texture and of especially dry and stiff appearance when drawn from the freezer. By way of contrast, either composition individually as a whipping agent in the same overall proportion gave substantially inferior performance in terms of whipping time and overrun.

In a standard mellorine mixture using hydrogenated soybean oil fat, we find that we can use much less of our whipping agent and get similar excellent results. That is, using a mixture of 0.08% composition E blended with 0.02% composition M we obtained 100% overrun using a freezing and whipping time of 11 minutes.

We have found that the best foodstuffs for generating stable foams for a drying process using our whipping assistant have in general at least about 30.0% solids in them because these have the best shear stability and resistance to collapse (maintenance of shape and structure) when blown with hot or cold air. We can also whip aqueous related non-food substances such as cosmetic creams, lotions, and pomades efficiently with our assistant. The assistant is particularly desirable in such use because of its bland, edible character.

The type of foam obtained from a particular fluent foodstuff is, of course, influenced by mixing action and time and temperature of beating. We find high speed aeration using counter-rotating, off-center beaters creating a vortex (the conventional table-mounted kitchen mixer action at highest or near highest speed) quite adequate. Pressurized containers using conventional food propellants also can be used.

Because fluent foods amendable to our whipping assistant are extremely diverse in composition, optimum economic foaming characteristics advantageously are determined individually for them by manipulating the whipping agent concentration therein, the source of and ratio of the fatty monoglyceride-diglyceride mixture, and the ratio of acyl lactylic acid-fatty acid blend to monoglyceride-diglyceride mixture within the limits heretofore stated. For the whipping process various edible gums such as gum tragacanth or algin derivatives can be added for thixotropy and stiffening if desired, and the whipping assistant can be blended with plasticizing edible materials, sorbitan esters of fatty acids and their polyoxyalkylene derivatives, glycol esters of fatty acids, sucrose esters, acetoglycerides, etc., to assist in dispersing it in the fluent aqueous food mass.

We claim:

1. A whipping assistant particularly adapted for foaming an aqueous, normally fluent foodstuff, said assistant consisting essentially of a blend of about 40 percent to about 80 percent by weight of stearyl and palmityl (mono) lactylic acids and about 20 percent to about 60 percent by weight of free stearic and palmitic acids, said blend being promoted with fatty acid mixed mono- and diglycerides having an iodine value not substantially above about 20, about 0.1 to about 7 parts of said blend being present per part of said mixed mono- and diglycerides, and the ratio of the monoglycerides to diglycerides being between about 0.2:1 and 9:1.

2. The whipping assistant of claim 1 wherein the acyl monolactylic acids in said blend are predominantly stearyl (mono) lactylic acids, of the total acyl lactylic acids present in said blend not substantially more than about 10% are acyl polylactylic acids, and said blend contains about 20–30% free fatty acids.

3. A comestible foam, the matrix of which consists essentially of aqueous normally fluent foodstuff and about 0.1–2% of the following whipping assistant; a blend of 40–80% stearyl and palmityl (mono) lactylic acids and 60–20% free stearic and palmitic acids promoted with fatty acid mixed mono- and diglycerides having iodine value not substantially above about 20, about 0.1 to about 7 parts of said blend being present per part of said mixed mono- and diglycerides, and the ratio of monoglycerides to diglycerides being between about 0.2:1 to about 9:1.

4. A dehydrated comestible suitable for reconstitution with water, said comestible consisting essentially of fine particulate normally aqueous foodstuff having water content sufficiently low to exhibit ostensible dryness, and dispersed throughout said dry foodstuff about 0.1–2% of a whipping assistant consisting essentially of a blend of 40–80% stearyl and palmityl (mono) lactylic acids and 60–20% free stearic and palmitic acids promoted with fatty acid mixed mono- and diglycerides having iodine value not substantially above about 20, about 0.1 to about 7 parts of said blend being present per part of said mixed mono- and diglycerides, and the ratio of monoglycerides to diglycerides being betwen about 0.2:1 to about 9:1.

5. A process for foaming normally fluent aqueous foodstuff which comprises intimately dispersing therein about 0.1–2% of a whipping assistant consisting essentially of a blend of 40–80% stearyl and palmityl (mono) lactylic acids and 60–20% free stearic and palmitic acids promoted with fatty acid mixed mono- and diglycerides having iodine value not substantially above about 20, about 0.1 to about 7 parts of said blend being present per part of said mixed mono- and diglycerides, and the ratio of monoglycerides to diglycerides being between about 0.2:1 to about 9:1.

6. A process for dehydrating normally fluent aqueous foodstuff which comprises blending therein about 0.1–2% of a whipping assistant consisting essentially of a blend of 40–80% stearyl and palmityl (mono) lactylic acids and 60–20% free stearic and palmitic acids promoted with fatty acid mixed mono- and diglycerides having iodine value not substantially above about 20, about 0.1 to about 7 parts of said blend being present per part of said mixed mono- and diglycerides, and the ratio of monoglycerides to diglycerides being between about 0.2:1 to about 9:1, gasifying the resulting mixture, thereby forming a foamed mass of said foodstuff, dehydrating said foamed mass, and cooling the resulting dehydrated product.

References Cited
UNITED STATES PATENTS

| | | | |
|---|---|---|---|
| 2,981,629 | 4/1961 | Ginnette et al. | 99—206 |
| 3,146,110 | 8/1964 | Buddemeyer et al. | 99—118 X |
| 3,224,882 | 12/1965 | Luck et al. | 99—123 |

A. LOUIS MONACELL, *Primary Examiner.*

MAURICE W. GREENSTEIN, *Examiner.*